May 7, 1957   R. POLK, JR   2,791,171
JUICE EXTRACTOR
Filed July 15, 1955   4 Sheets-Sheet 1

INVENTOR
RALPH POLK, JR.
BY Mason, Fenwick & Lawrence
ATTORNEYS

May 7, 1957 — R. POLK, JR — 2,791,171
JUICE EXTRACTOR
Filed July 15, 1955 — 4 Sheets-Sheet 2
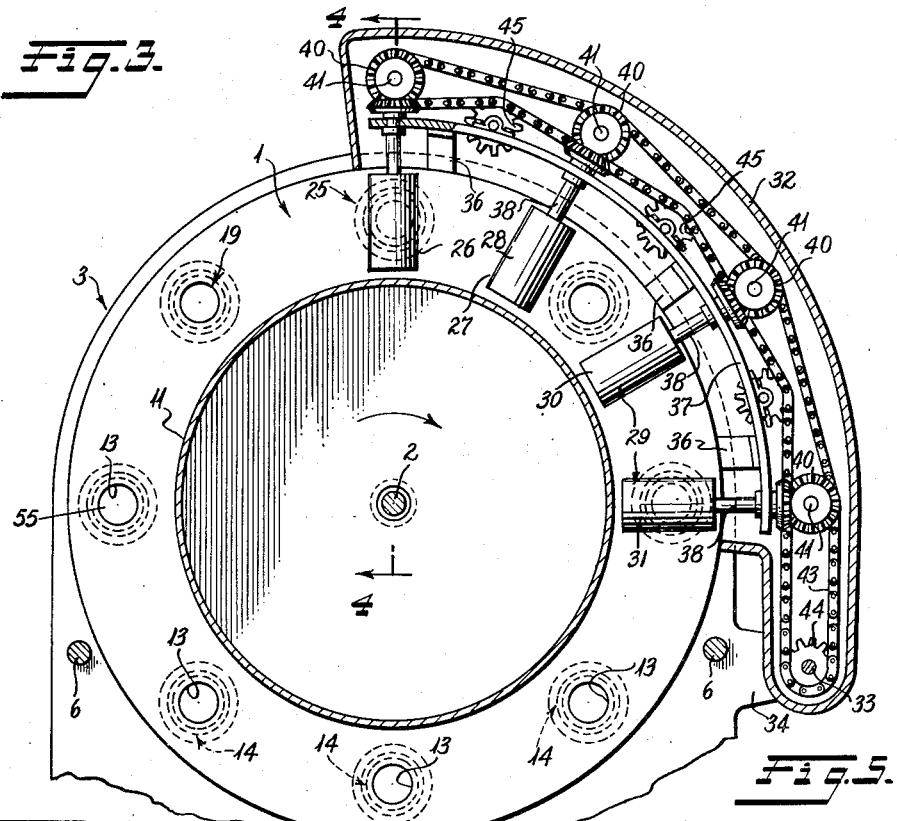
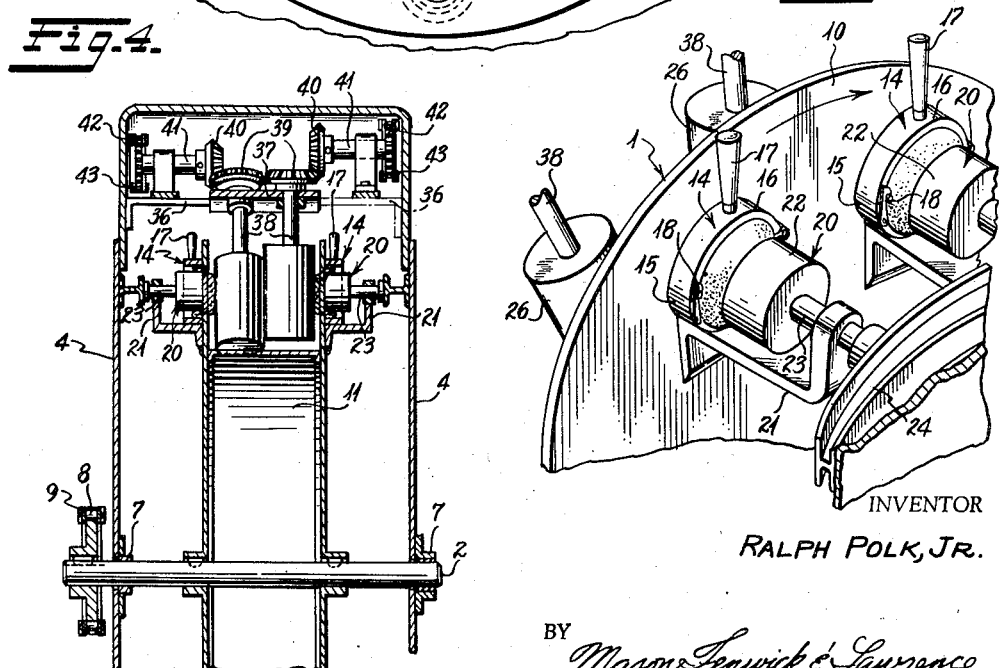
INVENTOR
RALPH POLK, JR.
BY Mason, Fenwick & Lawrence
ATTORNEYS May 7, 1957 R. POLK, JR 2,791,171
JUICE EXTRACTOR
Filed July 15, 1955 4 Sheets-Sheet 3
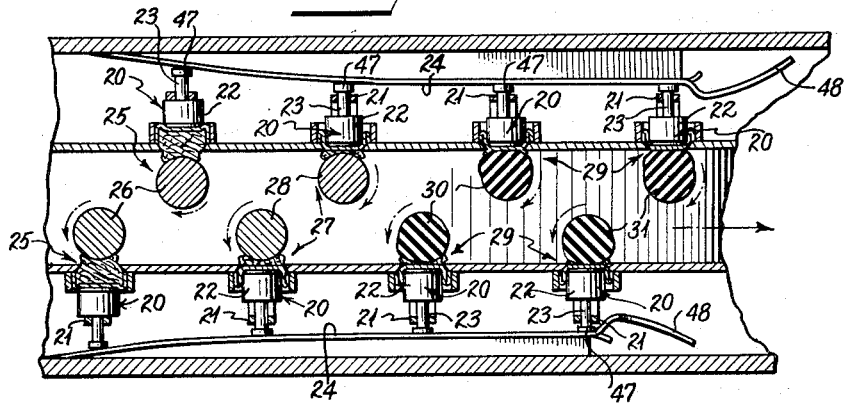
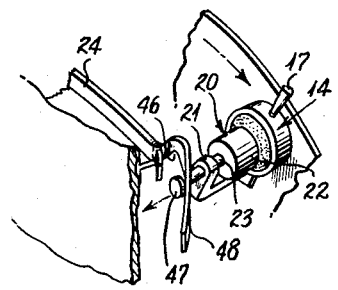
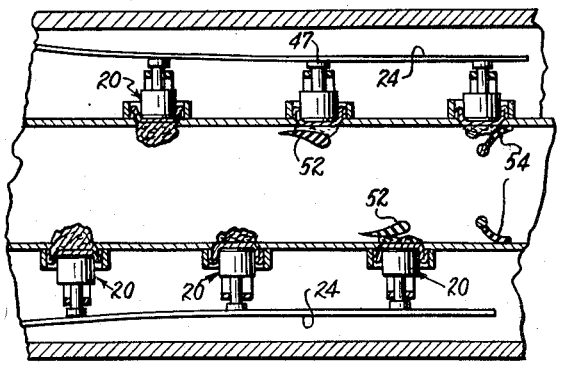
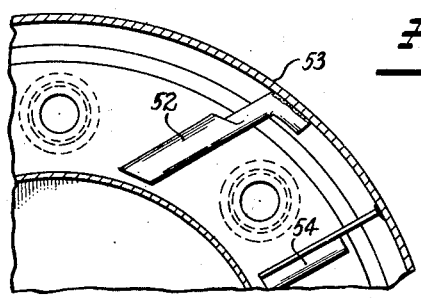
INVENTOR
RALPH POLK, JR.
BY *Mason, Fenwick & Lawrence*
ATTORNEYS May 7, 1957 R. POLK, JR 2,791,171
JUICE EXTRACTOR
Filed July 15, 1955 4 Sheets-Sheet 4

INVENTOR
RALPH POLK, JR.

BY Mason, Fenwick & Lawrence
ATTORNEYS

United States Patent Office 2,791,171
Patented May 7, 1957

2,791,171

JUICE EXTRACTOR

Ralph Polk, Jr., Tampa, Fla.

Application July 15, 1955, Serial No. 522,268

17 Claims. (Cl. 100—98)

This invention relates to devices for expressing juice from citrus fruit, and particularly to such devices which will carry out automatically the method disclosed in co-pending application Serial No. 396,823, filed December 8, 1953, now Patent Number 2,750,878, granted June 19, 1956.

In the mentioned co-pending application, there is described a method of expressing juice from citrus fruit whereby all the juice is removed without disturbing the unpleasant tasting oils in the peel and albedo. Simple means are also shown for carrying out the method. The method includes halving a citrus fruit, evaginating the cut halves to bring the crown of the peel into the plane of the cut edge to project the pulp beyond this plane, and removing the juice from the pulp.

The principal object of the present invention is to provide a machine which will carry out this method automatically as a continuous process.

A more specific object is the provision of a machine of this nature which will receive the citrus fruit halves, properly position them and move them progressively to each of several stations where the steps of the foregoing method are mechanically performed.

Another object is to provide such a machine which accomplishes the above objects by relatively simple means and will be inexpensive to build and operate.

Other objects of the invention will become apparent from the following description of practical embodiments thereof, when taken in conjunction with the drawings which accompany, and form part of, this specification.

In the drawings:

Figure 3 is a vertical section through the machine, taken on the line 3—3 of Figure 2;

Figure 4 is a partial transverse vertical section taken on the line 4—4 of Figure 3;

Figure 5 is a detail perspective view of a portion of the machine, showing the fruit-receiving sleeves and fruit-evaginating plungers;

Figure 6 is an arcuate section taken on a line through the centers of the fruit-receiving sleeves illustrating the action upon the fruit at the different stations;

Figure 7 is a fragmentary perspective view showing a portion of the cam track for controlling the movement of the plungers;

Figure 10 is a partial section, similar to Figure 6, illustrating a simple, modified form of the machine; and, Figure 11 is a fragmentary vertical section through the structure shown in Figure 10.

Figure 1:
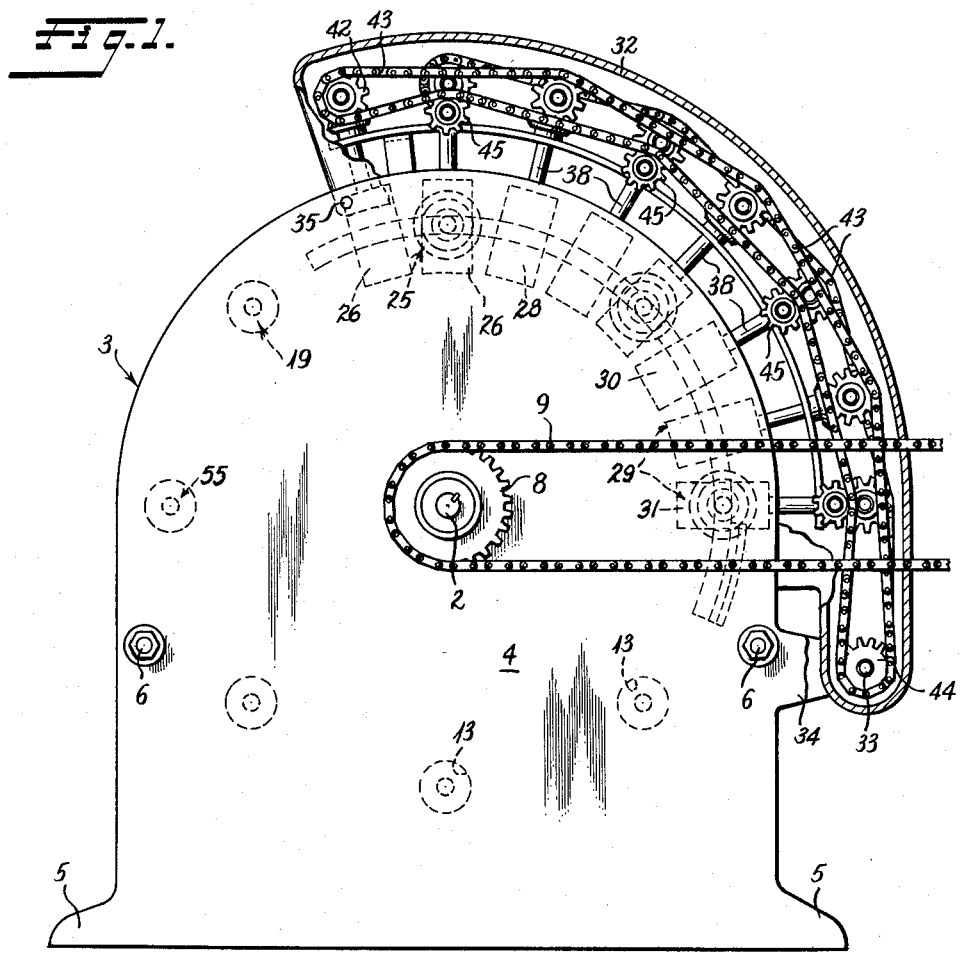
Figure 1 is a side view of a machine embodying the principles of the present invention.
Figure 2:
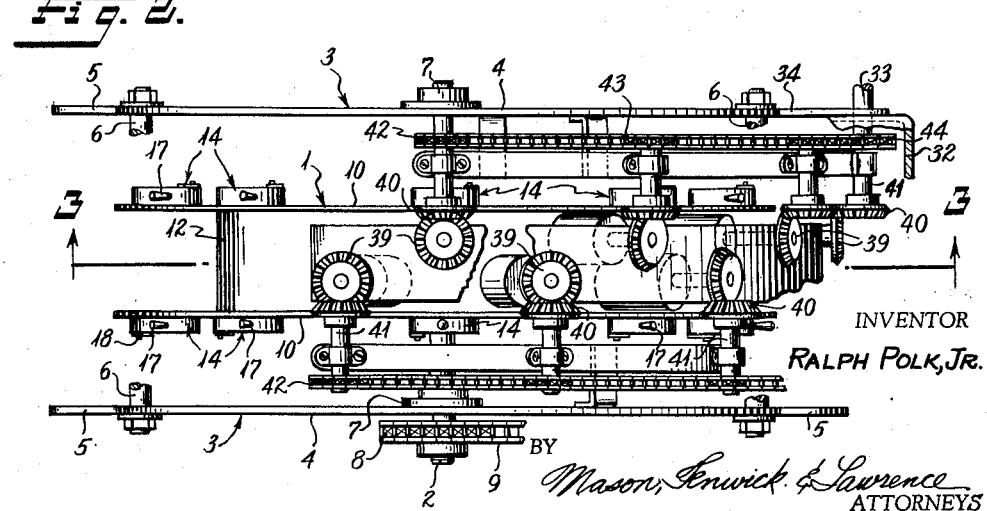
Figure 2 is a partial top plan view thereof.

Three forms which the machine may take have been illustrated. In one, the fruit is subjected to progressive pressure to project the pulp beyond the plane of the cut edge, and the pulp as it is projected, is gently pressed to express the juice. In another, the pulp is also projected from the peel, but then it is removed in stages from the peel, the peel wiped dry, and the juice removed from the pulp at some other point. In the third, the pulp is projected, removed in one operation, and the peel wiped dry.

Referring first to that form of the invention shown in Figures 1 through 7, there will be seen an extractor consisting of a rotatable drum 1, mounted upon a shaft 2, journaled in a suitable supporting frame 3.

The frame may take any form, and is shown as composed of two spaced side plates 4, having bases 5, and held in proper spaced relation by means of a plurality of spaces 6. The shaft 2 is journaled in bearings in the hubs 7, located centrally of the side plates. The shaft extends between the plates and projects beyond one of them to receive a sprocket 8, over which passes a drive chain 9 to rotate the shaft.

Drum 1 is fixed to the shaft to rotate therewith. The drum consists of two spaced side discs 10 secured to opposite sides of a hub 11. The side discs are of considerably larger diameter than the hub, forming an outwardly opening, annular channel 12 in which the various operating elements of the machine are located.

Each disc has a plurality of openings 13 concentrically arranged thereon, the openings being equally spaced apart and opening into the annular channel 12. Fruit-receiving sleeves 14 are provided on the inner faces of the discs, concentric to each opening. The sleeves are diametrically split, having one half 15 fixed to the disc and the other half 16 pivotally connected to the fixed section. A handle 17 may be provided for moving the pivoted section to and from closed position. A latch 18 holds the sections together when closed.

The openings 13 are beveled on the sleeve side, and the sleeves form retaining walls to hold the fruit against the discs, centered relative to the openings with a peripheral portion in contact with the disc. Fruit varying from one-half to three-quarters of an inch in diameter may be easily accommodated by the sleeve, as the sleeve walls will constrict the fruit to the diameter of the sleeve. The cut fruit is placed in the sleeve at a receiving station indicated at 19. It will be understood that any suitable automatic mechanism may be employed to halve the fruit and feed the halves into the sleeves at the receiving station if desired.

After the half-fruit is in place and the sleeve closed and latched, rotation of the drum carries the fruit in a clockwise direction, as shown, causing the pulp to be projected through the opening in the plate and the juice to be expressed. It should be noted at this point that the machine illustrated is a double machine, that is, each disc is provided with openings and sleeves. In order to reduce the width of the machine, the openings and operating mechanisms for the two sides are in staggered relation. As the two are identical in structure, however, only one side will be described with the same references numbers also applying to the same parts on the other side.

The pulp is projected by means of plungers 20, mounted upon the discs 10 coaxially of the sleeves and openings and movable along that axis. There will be a plunger 20 for each sleeve, and the plungers may be supported by brackets 21 carried by the discs. Each plunger consists of a cylindrical pressure head 22 and a stem 23 slidably supported in a bracket 21. The pressure head is adjacent the sleeve and has a radius which is smaller than that of the sleeve by slightly more than twice the thickness of the average fruit peel. This will enable the plunger to evaginate the fruit without squeezing the doubled-over peel between the sleeve wall and pressure head. The double-over peel will be sufficiently close, however, during the evaginating to free the pulp and rag from the outer peel wall and project it through the disc opening attached to the depressed crown of the peel. As there is no resistance to the extrusion of the fruit, it is projected quite easily with no abrasion.

Plungers 20 are operated by means of cam tracks 24 which are secured to the side plates 4 of the frame. The plunger stems move onto the track just after the cups leave the receiving station. The cam rise is gentle, so that the full forward motion of the plunger takes place over an appreciable arc of rotation of the drum.

When the plunger has moved forward a sufficient distance to project approximately one-half the pulp through the opening in the disc, the fruit arrives at a seed-liberating station 25. The means for liberating the seeds, and incidentally expressing some juice, consists of a metal roller 26, having its axis radial to the drum and its periphery spaced far enough away from the plate to avoid mashing the seeds. The roller is rotated at a peripheral speed substantially equal to the surface speed of the disc at the arc of travel of the fruit. Thus, the projected pulp is subjected to a wringer-like action between the roller 16 and the depressed crown of the peel rigidly backed by the plunger. The roller 26 and other rollers to be discussed, may be driven by any appropriate means. One illustrative type of drive will be described later.

Continued rotation of the drum causes the plunger to further depress the crown of the fruit until the peel of the crown is in the plane of the inner face of the opening 13. At this time, all of the pulp and rag will be projected beyond the plate and the pulp will be compressed to some extent because of passage under the roller 26. When the fruit is in this condition, it is brought to the juice-extracting station 27. Here, there is another roller 28, similar to roller 26, rotated at the same speed as roller 26 but having its periphery much closer to the disc. Passage of the pulp beneath this roller will cause it to be compressed to approximately one-quarter inch, expressing substantially all of the juice from the rag. Due to the fact that the surfaces of the disc and roller are moving at the same speed in the same direction, the juice will be wrung from the rag without excessive pressure and no abrasion.

The fruit is moved next to a peel and rag drying station 29 where any remaining juice is removed and the peel with attached rag is wiped dry. This may be accomplished in a single operation or in two or more stages. As two stages have been found to give highly satisfactory results, two drying rollers, 30 and 31 are shown, positioned to contact the fruit in sequence. These rollers are of rubber, or have a rubber coating of sufficient thickness to allow them to deform. Rollers 30 and 31 are mounted so that they contact the disc with enough pressure to be flattened somewhat. This will enable the rollers to have substantial surface contact with the fruit, yet compensate for different peel thicknesses. The rollers are driven in the same direction and at the same speed as those previously described.

As mentioned above, the various rollers may be mounted and driven in any convenient manner. The entire drive is shown as mounted in a housing 32 which may be pivotally connected to the frame so that it may be swung back to lift the rollers out of the drum channel for cleaning. Housing 32 is of inverted U-shape in cross-section, and is pivoted by means of the shaft 33 to a bracket 34 extending from the side of the frame. The edges of the housing may rest upon the sides of the cam tracks 24, when in operative position, and be held against movement by a pin 35, or other locking means.

Brackets 36, secured to the sides of the housing, support an arcuate bearing plate 37 in which the shafts 38 of all of the extractor rollers are journalled. Above the plate 37, the shafts 38 each carries a bevel gear 39 which gears are in mesh with bevel gears 40 mounted upon shafts 41 journalled in bearings carried by the brackets 36. Each shaft 41 carries a sprocket 42, and a chain 43 is trained about these sprockets and a drive sprocket 44 mounted on the shaft 33. If desired, idlers 45 may be positioned intermediate the sprockets 42 to lift the bottom flight of the chain to hold it in contact with the sprockets. It will be understood that the rollers associated with the two discs will be driven by separate but similar drives, both powered from shaft 33. Shaft 33 and shaft 2 may be driven from any suitable source. It is important, however, that the surface speed of all rollers be the same and equal to the surface speed of the discs on the centers of the openings 13.

It is believed that the operation of the device will be clear from the above description, and that a detailed review is not necessary. One part of the operation has not been explained, however. It is necessary to withdraw the plungers after the extruding operation is completed. To do this, the cam track 24 has been shown as having an offset near its end. The face of the cam is notched at this point, as at 46, to permit the heads 47 of the plunger stems to pass behind the cam track. The reverse bend 48 in the track withdraws the plungers from the sleeves as the drum rotates to carry them beyond the last drying roller. At a convenient point in the drum rotation after the plungers are withdrawn, as at station 55 for example, the sleeves may be manually opened and the peel removed.

Figure 8:
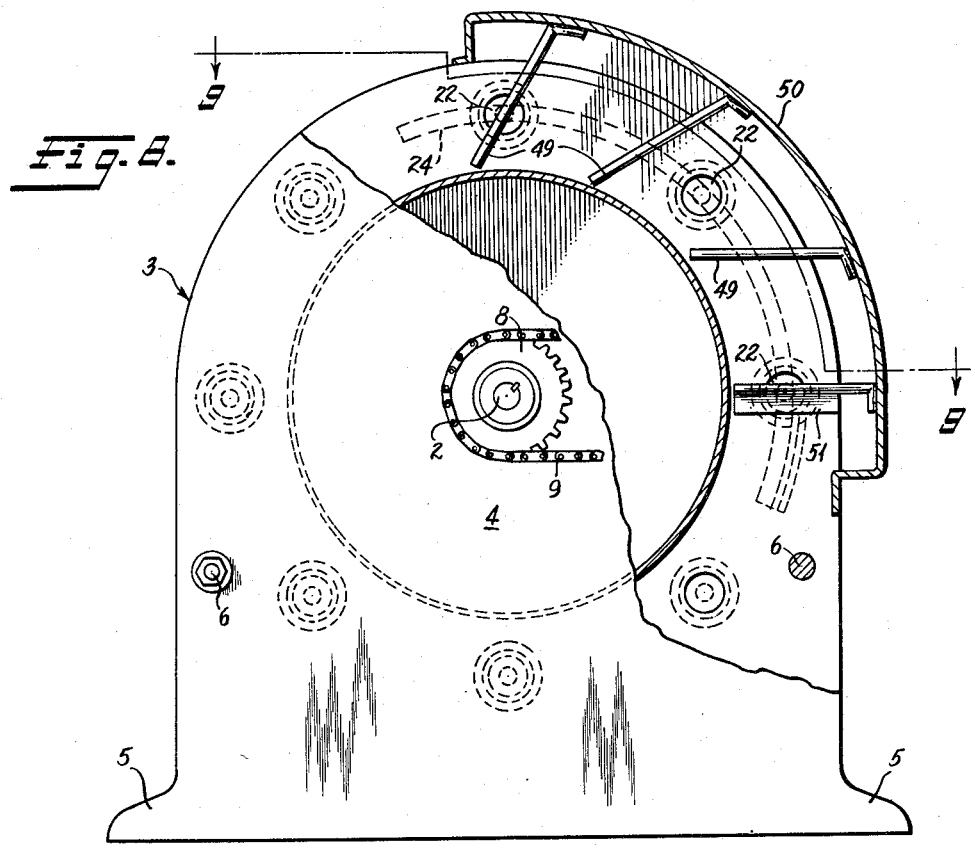
Figure 8 is a side elevation, partly broken away, illustrating a modified form of the invention.
Figure 9:
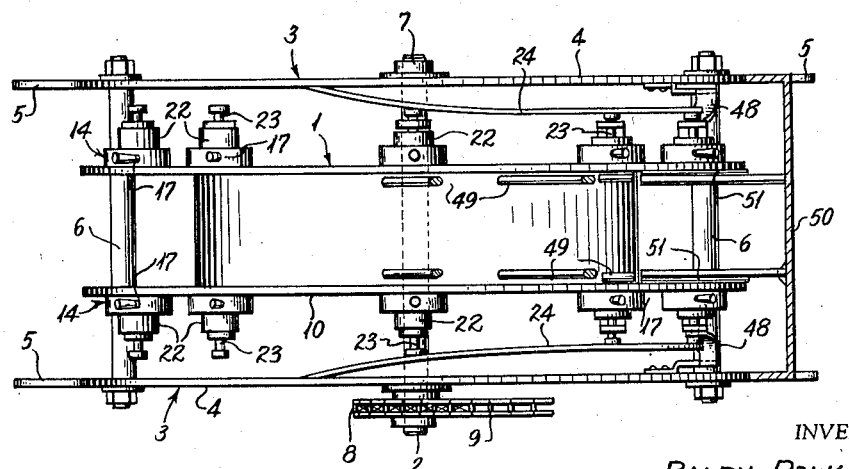
Figure 9 is a horizontal sectional view taken on the line 9—9 of Figure 8.

A modification of the invention is shown in Figures 8 and 9. Here the supporting frame, drum structure, drum operating means and plunger structure are the same as previously described. The pulp-contacting members, however, are different and the operation upon the fruit is different.

In this form of the invention, rods 49 are mounted on a cover plate 50, attached to the frame, and extend inwardly to intersect the projected arcuate path of the orifices 13 in the discs of the drum 1. The rods are arranged at an angle to the radii of the drum and fairly close to the inner surfaces of the discs. The cam track 24 is designed and positioned so that it will operate the plungers progressively to eject the pulp in stages for presentation to the various rods. At a final station, there is a wiper blade 51, mounted sufficiently close to the disc so that it will flex transversely for wiping contact with the fruit.

In operation, the drum rotates to bring an orifice to the first rod 49. Before reaching the rod, the plunger is pressed inwardly ejecting a portion of the pulp through the orifice and beyond the disc. Contact with the rod serves to strike off the projecting pulp from the fruit. Continued rotation ejects more of the pulp and this is struck off. This operation is continued through as many stages as may be necessary to sever all of the pulp from the peel. The peel, with whatever stubble of rag may be left on it, then passes under the wiper blade which removes the last traces of juice from the remaining rag and the peel. One or more wipers may be used as found necessary or desirable.

The device just described will strike off the pulp in sections which may be carried off to other means for breaking down the pulp to completely release the juice. The rag may be removed in any desired manner. The principal sources of trouble with juice extractors arises from liberating liquid from the albedo. This will not occur with either of the machines described. Although the core and rag of grapefruit contain pectin and naringen, the latter being extremely bitter, the core and rag of oranges are much less objectionable. The form of the invention just described will be useful where it is not important that the core and rag are removed with the pulp for later separation.

In Figures 10 and 11 a further modified form of the machine, which can be manufactured much more cheaply than those just described, is shown. In this form, the frame and drum structure will be the same. Only the arrangement of the pulp contacting devices is changed.

The drum will be rotated as before and the plungers will depress the crown of the fruit to the plane of the inner face of the discs. The peel will be held in the sleeves and the pulp will be projected through openings in the discs. In this machine, the plungers will be fully depressed and the pulp entirely beyond the sleeve before the pulp is contacted.

A knife 52 is positioned at an angle to the radius of the drum and held in fixed position by any suitable framework 53, so that the rotating drum will carry the fruit by it. The knife is set quite closely to the disc, so that it contacts the fruit close to the peel. Thus, as the drum rotates the projected pulp and rag are cut from the peel, and the peel and albedo left intact.

As some juice cells will remain on the exposed albedo, a wiper 54 is used to remove them and dry the albedo. The wiper may take the form of a flexible blade, mounted so that it is flexed transversely by contact with the disc. This will permit the blade edge to enter the openings to wipe the exposed albedo dry.

In this form of the invention, as in that previously described, the pulp is removed without abrasion or compressive force upon the albedo. It also, may be used where the juice is to be released later and the core and rag then removed from the juice.

While in the above practical embodiments of the invention have been disclosed, it will be understood that the precise details of structure shown and described are merely for purposes of illustration, and the invention may take other forms within the scope of the appended claims.

What is claimed is:

1. In a juice extracting machine, a frame, a disk rotatably mounted on said frame, means to rotate said disk, means carried by said disk spaced apart there around and at equal radial distances from the center of said disk to circumferentially confine and support citrus half-fruit with the cut faces against said disk, said disks having openings therethrough centrally positioned with respect to each half-fruit supporting means, plungers carried by said disk and movable into and out of said half-fruit supporting means to press the crown of said half-fruit to the plane of the cut surface and project the pulp and rag through said openings, means supported from said frame adjacent the face of said disk opposite to that upon which said half-fruit is supported at least a portion of which is positioned to intersect the path of travel of the projected rag and pulp of the fruit to separate the juice from the pulp and rag of the fruit, and means also supported from the said frame and spaced from said juice and peel separating means to wipe portions of the fruit peel exposed through said openings.

2. In a juice extracting machine as claimed in claim 1, said half-fruit supporting means comprising sleeves each composed of two pivotally connected arcuate sections with one of said sleeve sections being fixed to said disk and means to lock the sleeve sections together.

3. In a juice extractor as claimed in claim 2, means to move said plungers in and out of said half-fruit supporting means as said disc is rotated.

4. In a machine for extracting juice from citrus fruit halves, a frame, a disk rotatably mounted on said frame, means to rotate said disk, said disk having a plurality of openings circumferentially spaced apart there around all of said openings being equidistant from the center of the disk, sleeves carried by said disk on one face thereof with one of said sleeves being mounted about each of said openings to receive citrus fruit halves and hold said fruit halves with their cut surfaces toward said disk, plungers carried by said disk one for each sleeve, said plungers being mounted for movement coaxially of said sleeves, means to move said plungers into and out of said sleeves as said disk is rotated to press the crown of fruit halves toward said disk to project the rag and pulp through said openings, means supported from said frame and having surfaces for rolling contact with the projected rag and pulp to press the juice from the projected pulp and rag, and additional means supported from said frame having a surface in rolling contact with said disk to wipe the peel of said fruit.

5. In a juice extracting machine as claimed in claim 4, said means for pressing the juice from the projected pulp and rag comprising a plurality of arcuately spaced rollers having their axes positioned radially of the disk, each successive roller in the direction of disk rotation being positioned closer to the disk than the preceding roller, and means to rotate said rollers at a surface speed equal to the surface speed of the disk at the centers of the openings therein.

6. In a juice extracting machine as claimed in claim 5, said rollers being non-deformable.

7. In a juice extracting machine as claimed in claim 4, said means for pressing the juice from the projected pulp and rag comprising a plurality of arcuately spaced non-deformable rollers having their axes positioned radially of the disk, each successive roller in the direction of disk rotation being positioned closer to the disk than the preceding roller, said means to remove moisture from the peel comprising at least one deformable roller radial of the disk and in surface contact therewith, and means to rotate all of said rollers at a surface speed equal to that of the disk at the centers of the openings therein.

8. In a juice extracting machine as claimed in claim 4, said fruit-receiving sleeves being in two sections pivoted together to circumferentially confine the fruit halves, and means to lock the sections together.

9. In a juice extracting machine, a frame, a disk rotatably mounted on said frame, said disk having at least one opening therethrough, means to circumferentially confine and support a citrus fruit half against one side of the disk overlying said opening, means carried by the disk to press the crown of the fruit half to the surface of the disk to project the pulp and rag of the fruit through the opening to protrude from the opposite side of said disk, a plurality of arcuately spaced elements positioned adjacent said opposite side of the disk and rotatable about axes radial to the disk with each successive element in the direction of disk rotation spaced a less distance from the face of the disk than the preceding element and the last in contact with said disk, means to rotate the disk, and means to rotate the elements for rolling contact with the projected rag and pulp.

10. In a juice extractor as claimed in claim 9, said last element being deformable.

11. In a juice extracting machine, a frame, a drum rotatably mounted on said frame, said drum having spaced end disks and a central hub therebetween with the disks of larger diameter than said hub to form an open channel about said drum, each disk having openings therein spaced apart arcuately of the disk and at equal distance from the center of the disk, means carried by said disks to circumferentially confine and support citrus fruit-halves against the outer faces of said disks overlying said openings, means to depress the crown of said fruit to the surface of the disks to project the pulp and rag of the fruit through said openings to protrude into said channel, pluralities of arcuately spaced successive elements in said channel adjacent the inner faces of said disks, each element being rotatable about an axis radial to said drum with each successive element, in the direction of drum rotation of each plurality, spaced a less distance from the surface of the disk to which it is adjacent than the preceding element of that plurality, and the last element of each plurality being in surface contact with the disk, means to rotate said drum, and means to rotate said elements for rolling contact with the rag and pulp projecting from the disk to which each element is adjacent, said last elements being in rolling contact with the disk surface to which they are adjacent.

12. In a juice extracting machine as claimed in claim 11, said means for supporting the fruit-halves comprising sleeves of two sections pivoted together and means to lock the sections together.

13. In a juice extracting machine as claimed in claim 11, at least the last element of each of said pluralities being deformable.

14. In a juice extracting machine as claimed in claim 11, said pluralities of elements and the means for rotating said elements being mounted in a housing pivotally connected to said frame, whereby said elements may be raised from said channel for cleaning.

15. In a juice extracting machine, a frame, a disk rotatably mounted on said frame, said disk having at least one opening therethrough, means to circumferentially confine and support a citrus fruit half against one side of said disk overlying said opening, means carried by the disk to press the crown of the fruit to the surface of the disk to project the pulp and rag through the opening to protrude from the opposite side of said disk, a fixed member carried by said frame positioned to intersect the path of travel of the protruding pulp during rotation of the disk to strip the pulp and rag from the peel, and a yieldable member in surface contact with the disk to wipe the peel after the pulp and rag are removed.

16. In a juice extracting machine, a frame, a disk rotatably mounted on said frame, said disk having a plurality of openings spaced therearound equally from the center of the disk, means to circumferentially confine and support citrus fruit halves against one side of said disk overlying said openings, means carried by the disk and operable over an appreciable arc of rotation of said disk to press the crown of the fruit to the surface of the disk to project the pulp and rag through the openings to protrude from the opposite side of the disk, fixed members carried by said frame and equally spaced from the disk to intersect the path of travel of the protruding pulp during rotation of the disk, said members being spaced apart in the area of said arc of rotation to progressively strip the pulp and rag from the peel as it is protruded, and a yieldable member in surface contact with the disk beyond said members in the direction of disk rotation to wipe the fruit peel exposed in said openings after the pulp and rag are removed.

17. In a juice extracting machine, a frame, a disk rotatably mounted on said frame, said disk having at least one opening therethrough, means to circumferentially confine and support a citrus fruit half against one side of said disk overlying said opening, means carried by the disk to press the crown of the fruit to the surface of the disk to project the pulp and rag through the opening to protrude from the opposite side thereof, a member carried by said frame and positioned so that at least a portion thereof intersects the path of travel of the projected pulp and rag, and a yieldable member in surface contact with the disk to wipe the peel exposed through said opening.

References Cited in the file of this patent
UNITED STATES PATENTS

| | | |
|---|---|---|
| 369,711 | Hodson | Sept. 13, 1887 |
| 897,487 | Prescott | Sept. 1, 1908 |
| 1,855,221 | Burkholder et al. | Apr. 26, 1932 |
| 2,092,786 | Taylor | Sept. 14, 1937 |
| 2,420,679 | Pipkin | May 20, 1947 |